Aug. 27, 1968 DAVID CHANG 3,399,393

TWO-PROBE THREE-CAP FLUX SENSITIVE MAGNETIC HEAD

Filed Dec. 7, 1964 3 Sheets-Sheet 1

INVENTOR
DAVID CHANG

BY

ATTORNEY

Aug. 27, 1968 DAVID CHANG 3,399,393

TWO-PROBE THREE-CAP FLUX SENSITIVE MAGNETIC HEAD

Filed Dec. 7, 1964 3 Sheets-Sheet 2

United States Patent Office 3,399,393
Patented Aug. 27, 1968

3,399,393
TWO-PROBE THREE-GAP FLUX SENSITIVE MAGNETIC HEAD

David Chang, Poughkeepsie, N.Y., assignor to International Business Machines Corporation, New York, N.Y., a corporation of New York Filed Dec. 7, 1964, Ser. No. 416,453
10 Claims. (Cl. 340—174.1)

ABSTRACT OF THE DISCLOSURE

A magnetic reading head is constructed to provide an output signal which is a derivative signal of the space between magnetic flux paths as opposed to the speed of passage of flux transversals past the reading head. The construction includes two outer magnetic core pieces and two inner magnetic probes which provide, at the magnetic tape surface, three non-magnetic gaps, with each of the two probes having a gap between them, and each probe forming a gap with an associated outer pole piece. An excitation current is passed through the magnetic probes, each of which has oppositely wound sense windings, to thereby provide the magnetic reading head with the ability to read not only magnetic tape in motion, but also magnetic tape which is stationary or moving at a variable speed.

This invention relates to apparatus for reproducing signals recorded on a magnetic medium and more particularly to a magnetic head for both dynamic and static sensing of high density magnetic tapes and similar recording media.

One of the limitations of a data processing system's operation is the limited storage capacity of tape units that supply data to the system. A particular way of increasing storage capacity is to increase the storage density of the magnetic tape. However, increases in storage density are limited by, among other things, the ability of the read heads and accompanying amplifying system to respond to the flux change of the data bits stored on the tape. For example, as the storage density is increased, the time period between pulses approaches the pulse width of the output signal for a given speed of operation of the tape unit. In such a situation, amplitude detection cannot be used when the sense amplifier cannot distinguish between the resultant rapidly occurring signals. In lieu of this type of detection, detection has been achieved in the past by differentiating the signal with respect to time prior to amplification. However, when the memory unit is to be operated under static and random speed conditions as well as constant speed conditions, the time scale may be non-linear and in such circumstances accurate time differentiated signals cannot be achieved.

Certain magnetic recording heads in the prior art comprise a pair of core pieces so adapted as to provide a narrow gap resulting in a reversal of the flux field in the core pieces when a magnetic pole passes over the gap. A resultant output signal is induced in a sense winding by this change of flux direction when the recording medium is moved across the head gap at a suitable velocity. In situations where static sensing of the state of the recording is required, the flux within the core pieces may be varied upon variation of the reluctance associated with the core pieces, for example, by excitation with an alternating current supplied through a coil coupled to the core pieces. The output signal derived from this latter type of head is in the form of a varying signal the envelope of which is a representation of the state of the flux adjacent that portion of the recording medium at the gap of the head irrespective of the motion of the recording medium. A particular adaptation such as static sensing system is disclosed in my copending application Ser. No. 195,267, now Patent No. 3,239,823, which was filed May 16, 1962, and assigned to the assignee of the present application.

While the method of time differentiation of an amplitude pulse cannot be employed in a static or random speed operation, a spatial differentiation would allow for a type of detection other than amplitude detection and would not be dependent on the type of motion imparted to the recording medium. When amplitude or peak detection is not required, the limitations which such a detection system place upon the storage density of the recording medium need not be considered.

It is an object of the present invention to provide an improved magnetic head for the sensing of data stored in a record medium at a high density.

It is another object of the invention to provide a magnetic head for the sensing of data in a record medium at a high density irrespective of the motion of the record medium.

It is still another object of the present invention to provide a magnetic head for sensing high density data on a record medium where the record medium is sensed under either static, random speed or constant speed conditions.

As noted above, peak detection of data stored in high density record media cannot be achieved by time differentiation of the output signal in situations where static or random speed operation is required. The merit of such a time differential system in a constant speed operation resides in the fact that it is a change of polarity of the signal that triggers the sense amplifier rather than a peak voltage, the magnitude of which may block the amplifier. With the magnetic head of the present invention, excitation of the head is provided so that the electrical output signal is a representation of the state of the magnetic record flux irrespective of the motion of the record. Moreover, the magnetic head of the present invention is provided with two probes to define three gaps spaced apart from one another and an output winding so arranged as to provide a space differentiated output signal characterized by a voltage change that may be utilized to trigger a sense amplifier without blocking the amplifier irrespective of the time period between sensed signals or the speed and density of the record medium.

The present invention is particularly adaptable for the employment of well known non-return-to-zero techniques, in one common form of which the magnetic storage surface is continuously magnetized to saturation in one direction or the other, the direction of magnetization being reversed in a bit cell in which a one is recorded and being maintained constant in either direction in a bit cell in which a zero is recorded. With the present invention, the output signal will result where there is such a change of flux signifying a one irrespective of the motion of the record medium being sensed or read.

A particular embodiment of the sensing head of the present invention includes two core pieces to provide return magnetic paths, two magnetic probes positioned therebetween to define three non-magnetic gaps spaced apart in the direction of motion of the magnetic record medium and a sense winding that is wound in opposite directions about the respective probes.

When the sensing head of the present invention is employed without an excitation coil and the record medium is moved across the head at a constant speed, a magnetic pole moving across the gaps will result in flux change in each of the probes and induce a voltage in each of the windings of the sense line. Since the respective windings are oppositely wound, the respective induced voltages would tend to cancel one another out except that the respective probes are displaced in distance and thus the respective induced signals of opposite polarity are displaced in time with the output signal from the entire sense line representing a function of the distance between the respectiive probes. When static operation is required and the excitation coil is employed, the resultant voltage induced in each coil will be in the form of a modulated wave the envelope of which represents a facsimile of the magnetic flux adjacent the respective probes. Thus, the resultant output signal will indicate the existence of a magnetic pole or the change of flux direction in the same manner for static operation or operation of the record medium at either a constant speed or at a random speed.

A feature, then, of the present invention by which a high density record media can be read, resides in a sensing head structure including two distinct probes which, with the core pieces of the structure, define three distinct non-magnetic gaps spaced apart from one another and a sense line that is wound about each of the probes in opposite directions to provide an output signal that indicates the existence of a pole in the record medium by a change in the output signal level.

A more specific feature of the present invention resides in the above described structure in combination with an excitation coil to provide an output signal which indicates the existence and exact position of a pole in the magnetic record medium irrespective of whether the record medium is static or moving at a random or constant speed.

These and other objects, advantages and features of the present invention will become more readily apparent from a review of the following specification when taken in conjunction with the drawings wherein:

FIGURE 1 is a pictorial view of the structure of the present invention;

FIGURES 2*a–d* illustrate the flux pattern in the structure of the present invention for various positions of a magnetic pole adjacent thereto;

FIGURES 3*a–f* represent a series of curves of the flux variation and the resultant output signal of the sense line for one embodiment of the present invention when the record medium is moved across the head structure;

FIGURES 4*a–f* represent a series of curves of the flux variation and the resultant output signal of the sense line for another embodiment of the present invention when the record medium is moved across the head structure;

Figure 1:
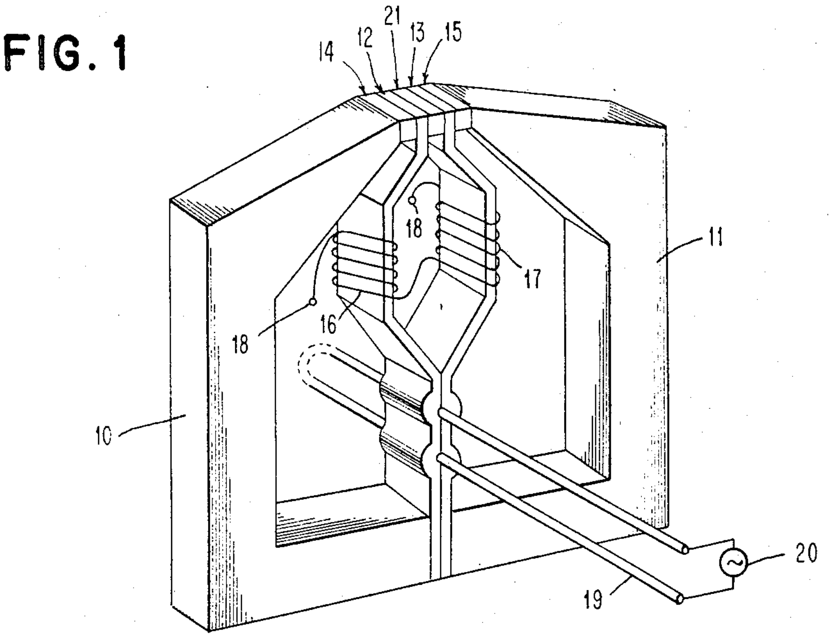

Referring now to FIGURE 1, the structure of the present invention as shown therein comprises core pieces 10 and 11 which together with probe members 12 and 13 serve to respectively define gaps occupied by non-magnetic spacers 14 and 15 and to provide the return magnetic paths from one side of each of the respective gaps to the other side. It will be understood that the core pieces and the probes are of a ferromagnetic material and the respective magnetic circuits to be sensed are completed from a magnetic pole, when that pole resides over the head structure, through one or both of the probes and the respective core pieces to the adjacent magnetic poles on the record medium. The respective gaps and probes may have thicknesses of only a few mills.

As distinct from a single probe flux sensitive head, probes 12 and 13 of the present invention serve to provide distinct and separate magnetic paths and to this end are separate from one another by non-magnetic spacer 21 in the region adjacent to the record medium and are of such a form as to have an even greater distance separation in the region in which sense line 18, including winding coils 16 and 17, is wound about the individual probes. Coils 16 and 17 are wound respectively about probes 12 and 13 in opposite directions as indicated in FIGURE 1. Except for the above referred to separation between probes 12 and 13, the remaining portion of these probes are contiguous with one another for common excitation by excitation conductor 19, as illustrated in FIGURE 1. In the embodiment of FIGURE 1, the excitation is along the joint magnetic path and this embodiment is preferred because of simplicity and the fact that excitation noise will be in common mode allowing for a common mode rejection by oppositely wound sense coils 17 and 18. However, in another embodiment of the present invention, the excitation may be adapted to each probe separately.

The term "pole" is employed to denote a point on the record media at which there is a change in flux direction or more specifically a point at which the flux is perpendicular to the record media and diverges therefrom along the record media surface. In the non-return-to-zero mode of recording for which the present invention is well adapted, a pole as defined above would represent a one in the bit cell in which the pole is located and lack of a pole in a given bit cell would indicate the recordation of a zero. When this manner of recordation is employed, it will be appreciated that each pole on the record media will be of opposite polarity from the poles adjacent to it irrespective of the distance between poles or irrespective of the number of zeros recorded on the record media between any given two ones recorded on the recorded media. Assuming that pole **22*a*** shown in FIGURES 2*a–d* to be a north pole, then it will be appreciated that poles **22*b* and 22*c* illustrated in FIGURE 2 to be on either side of pole 22*a*** will be south poles.

For the purposes of a detailed description of both static and constant speed operation of the magnetic tape with which the present invention is employed, four different positions of a pole relative to the magnetic head will be considered as shown in FIGURES 2*a–d*. In FIGURE 2*a*, pole **22*a* is shown to the left of both probes and the flux path to pole 22*b* primarily will be through both core pieces 10 and 11. As pole 22*a* moves over probe 12, the flux pattern will be through probe 12 and core piece 11 to pole 22*b* and through core piece 10 to pole 22*c*. As pole 22*a* moves across probe 13, the flux pattern will be through probe 13 and core piece 10 to pole 22*c*. Finally when pole 22*a* has moved completely to the right of both gaps, the flux pattern will be through core pieces 10 and 11 to pole 22*c*. It will be appreciated that flux will be induced in either of probes 12 and 13** only when the respective pole is passing over that probe.

Figure 3:
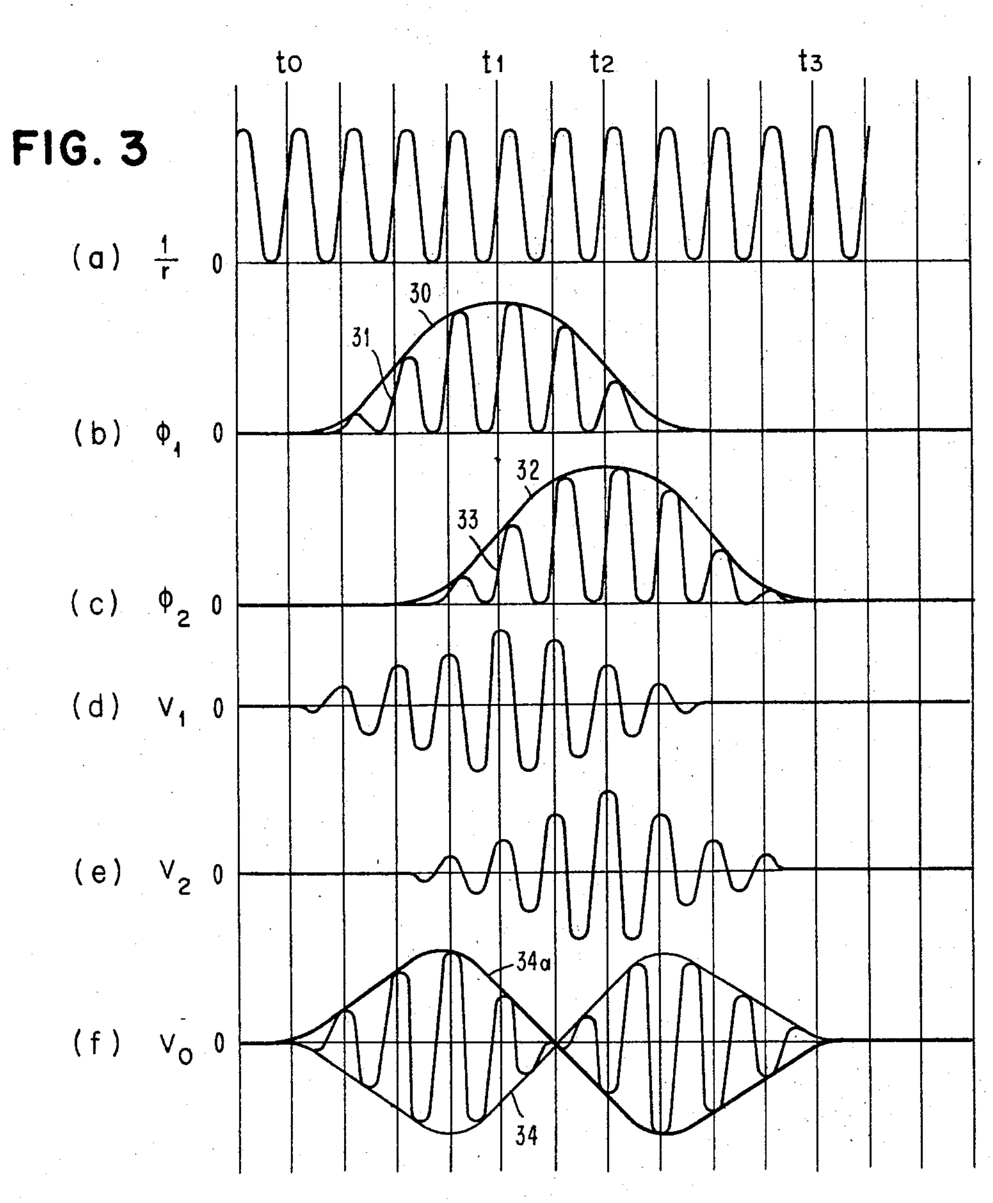

To illustrate the function of the two probe head of the present invention, reference is now made to FIGURE 3 which is a set of waveforms of both the flux in the respective probes and the resultant output signal from sense winding 18 when the respective probes are periodically blocked by an excitation frequency supplied to excitation coil 19 by frequency source 20. When a frequency $f$ is supplied to excitation coil 19, the respective probes will become saturated or blocked during the peak of each half cycle of that frequency with the result that the reluctance in probes 12 and 13 will vary at a frequency twice that of the excitation frequency, namely $2f$. When the respective probes are thus saturated, no flux can flow through the respective probes and no signal can be detected in sense line 18. FIGURE 3*a* is representative of the reciprocal of this reluctance variation and is shown primarily as a sine wave which shall be defined here as having a frequency twice that of the excitation frequency in excitation coil 19. As a magnetic pole such as pole **22*a* starts to cross gap 14 and crosses probe 12, the flux induced in probe 12 will be as illustrated by curve 30** in FIGURE 3*b*. Because of the blocking effect of the excitation frequency, however, the actual flux $\phi_1$ in probe 12 will be as illustrated by curve 31 in FIGURE 3*b* which in essence is an amplitude modulated wave of frequency $2f$. The envelope of this frequency will reach its peak at time $t_1$ when pole **22*a* is directly over probe 12** and shall then decrease back to zero.

Similarly, as pole **22*a* starts across probe 13, the flux $\phi_2$ induced in probe 13 will be as illustrated by curve 33** of FIGURE 3*c* which is an amplitude modulated wave having an envelope illustrated by curve 32 which envelope reaches its peak at time $t_2$ when pole **22*a* is directly over probe 13**.

The voltage $V_1$ induced in coil 16 of sense winding 18 is illustrated by FIGURE 3*d* and the voltage $V_2$ in coil 17 is illustrated by FIGURE 3*e*. Since coil 17 and coil 16 are wound in opposite directions, the voltage variations in the respective coils normally tend to cancel one another with the resultant output $V_0$ from sense line 18 being of a form shown in FIGURE 3*f*. Since the voltage induced in coil 17 will dominate the resultant output when the magnetic pole is passing over probe 13, this portion of the resultant output will be of a frequency 180° out of phase with that portion of the output signal when the respective magnetic pole is passing over probe 12 and this phase shift is clearly indicated in FIGURE 3*f*. Thus, the presence of a pole moving across the two probe head can be detected by standard means to detect a phase reversal or the output signal having envelope 34 could be supplied to an amplitude demodulator in which case amplitude detection can be employed. However, as has already been pointed out, amplitude detection has certain disadvantages which can be overcome by the present invention. It will be observed that the positive and negative halves of envelope 34 are symmetrical about the horizontal axis. However, if this signal is added to a standard signal of the same frequency for comparison in a manner employed in some phase detection systems, the envelope of the curve would be as illustrated by curve **34*a***, the significance of which will be more thoroughly discussed below.

Another embodiment of the present invention is obtained when a constant current is passed through sense winding 18 which results in a biasing of the flux variation and resultant output signals in the respective coils 16 and 17. The biasing is in opposite directions for the respective probes as illustrated in FIGURE 4.

Figure 4:
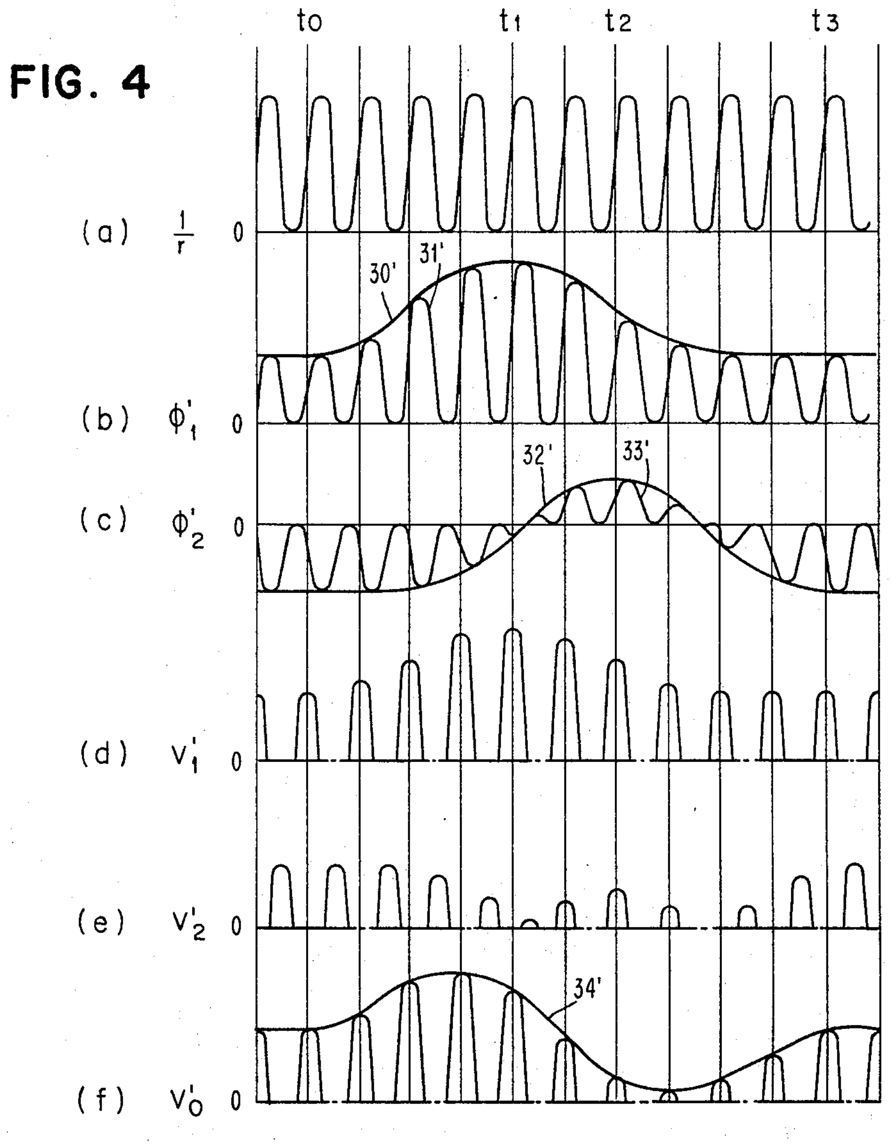

FIGURE 4*a* illustrates the reluctance variation in probes 12 and 13 and is the same as FIGURE 3*a*. FIGURE 4*a* is shown merely to provide a reference for comparison between the waveforms of FIGURE 4 and FIGURE 3. FIGURE 4*b* illustrates the flux variation $\phi_1$ in probe 12 when the sense line is under a bias and is similar to FIGURE 3*b* with the exception that there is a flux variation in probe 12 at all times due to the reluctance variation and to the flux induced in probe 12 by the current flowing through coil 16. The effect of this is shown in FIGURE 4*b* where envelope 30′ of the curve has been shifted upwardly when compared to the corresponding curve of FIGURE 3*b*. Similarly, flux variation $\phi'_2$ in probe 13 will be as illustrated in FIGURE 4*c* which corresponds to FIGURE 3*c* with the exception that envelope 32′ of the curve has been shifted in a downward direction or in a direction opposite to that of the shift of envelope 30′ in FIGURE 4*b*. Voltage $V'_1$ as induced in coil 16 will be as illustrated in FIGURE 4*d* which shows only the positive half of the signal, the envelopes of the negative and positive halves of the signal being symmetrical about the horizontal axis. Similarly, voltage $V'_2$ as induced in coil 17 will be as shown in FIGURE 4*e*. Since coils 16 and 17 are wound in opposite directions, output signal $V'_0$ obtained from sense winding 18 will again be the difference between these two signals and is illustrated in FIGURE 4*f* which again only illustrates the positive half of the signal. FIGURE 4*f* is in the form of an amplitude modulated signal, the envelope 34′ of which represents the desired output signal that can be obtained by demodulation.

Figure 5:
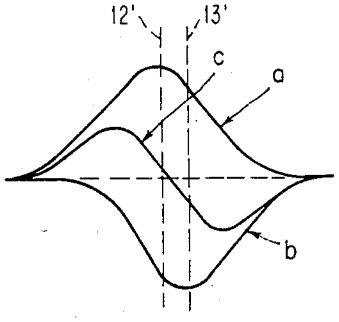
FIGURE 5 is a graphical representation illustrating a functional principle of the present invention.

The manner in which the structure of the present invention achieves the desired end results is illustrated diagrammatically in FIGURE 5. Curve A in FIGURE 5 is representative of the type of pulse that would be received from a single probe head and also represents the flux change as a pole passes over one of the probes of the two probe heads. Curve A is equivalent to the envelope of the output signal generated by that flux change in probe 12. Curve B is representative of the flux change in the second probe and also of the output signal envelope due to the flux change in probe 13. Curve B is represented as a negative going signal while curve A is represented as a positive going signal because of the oppositely wound coils of sense winding 18. The resultant combination of these curves is curve C. Curve C represents the difference between curves A and B as obtained by the present invention and may be described as a space derivative of the flux associated with a pole passing over or residing in the vicinity of the head. It will be observed that curve C is analogous to the phase envelope of **34*a* of FIGURE 3 and to the amplitude envelope 34′** of FIGURE 4*f*. While the envelope 34 of FIGURE 4*f* is obtained by the amplitude demodulation of a time dependent signal, this signal is obtained by the movement of the pole across the head at a given velocity and therefore the curve is also representative of the spatial distribution of the flux associated with a given pole on the magnetic medium being sensed. Furthermore, this spatial dependency of the head output will hold in a qualified sense irrespective of the motion of the recording medium, that is to say, irrespective of whether the tape is moving at a constant speed, a random speed or is stationary.

Figure 2:
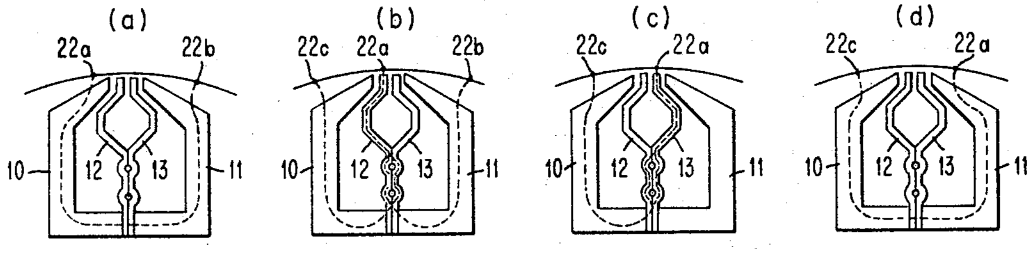

In a more specific sense, it will be appreciated that if the recording tape is moved at a random speed, envelope 34 of FIGURE 4*f* would be distorted horizontally on a linear time scale, but would be invariant on a linear space scale. Furthermore, when the tape is being statically sensed, the output signal would be of a magnitude determined for that point on envelope 34′ that corresponded to the respective space position on the tape. For example, if pole **22*a*** of FIGURE 2 were stationary as indicated in FIGURE 2*a*, then the output signal would be of a magnitude corresponding to envelope 34′ of FIGURE 4*f* at time $t_0$. If pole **22*a*** were stationary at a position inlicated in FIGURE 2*b*, the output signal would be of a magnitude corresponding to the magnitude of envelope 34′ at time $t_1$. If pole **22*a*** were stationary at a point illustrated in FIGURE 2*c*, the magnitude of the output signal would correspond to the magnitude of envelope 34′ at time $t_2$, and if pole **22*a*** resided in the stationary position as indicated in FIGURE 2*d*, the magnitude of the output signal would correspond to envelope 34′ of FIGURE 4*f* at time $t_3$.

Figure 6:
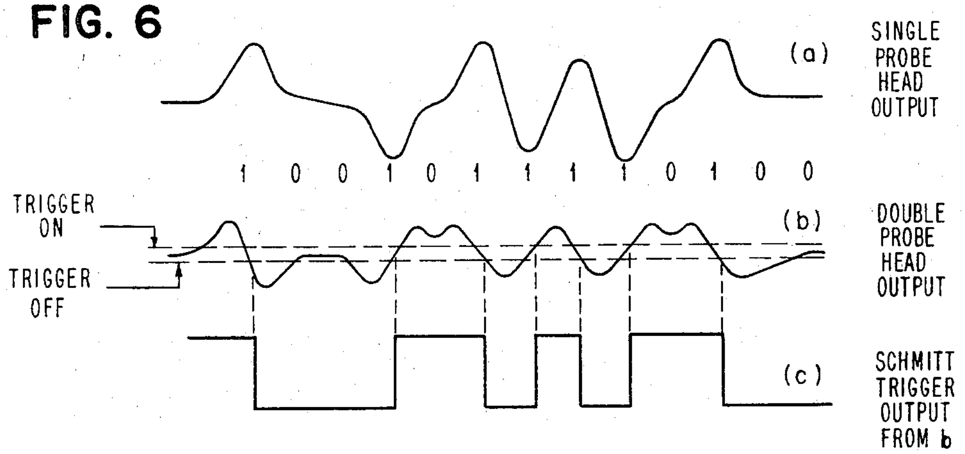
FIGURE 6 represents a typical output signal for the sensing of a particular set of data from the record medium and the corresponding output signal from the sensing amplifier.

The manner in which the output signal obtained from the present invention may be utilized and its advantage over a single probe head is clearly illustrated in FIGURE 6. After the output signal is demodulated, it will be in the form as illustrated by curve B of FIGURE 6. This signal is supplied to a trigger circuit, such as a Schmitt trigger circuit, of a type that when the signal above a given voltage level, the trigger circuit is in an on condition and when the signal drops below a given voltage level, the trigger circuit is placed in an off condition. The output signal from the trigger circuit will then be of the type illustrated in curve C of FIGURE 6.

The advantages of the present invention and the type of output signal received therefrom is illustrated by a comparison of curve B of FIGURE 6 and curve A of FIGURE 6, where curve A represents the type of signal that would be received from a single probe head which relies upon amplitude peak detection to generate its signals and has all the disadvantages of amplitude detection, namely the lack of accuracy and sensitivity in determining the exect point at which the pole exists because of the width of the respective pulses and also the magnitude of the pulse which may prevent the sense amplifier from responding to a second pulse occuring shortly therafter. Such disadvantages become more critical as the storage density of the recording medium is increased.

An explanation of the single probe head may be found in my above referred to copending application. In essence, the advantage of a single probe head over a single gap head resides in the ability of a single probe head to detect the component of the flux that is perpendicular to the magnet record medium while the single gap head is employed to detect the longitudinal component of such flux and provides an output signal when there is a change of flux direction or polarity. The present invention employs two distinct probes adapted to detect flux components perpendicular to the record medium at two distinct locations thereon and provide an output signal representing the difference of such components. This output signal is generated in the sense windings only when the respective flux components differ, that is when a magnetic pole resides between or over one of the respective probes.

Figure 7:
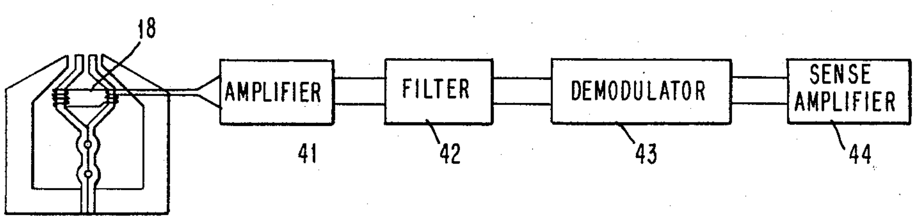
FIGURE 7 is a schematic diagram of an amplifying system that may be employed with the present invention.

Circuitry of the type that may be employed by the present invention is illustrated in FIGURE 7 wherein the output terminals of sense winding 18 are supplied first to amplifier 41 and then to a frequency filter 42. The purpose of filter 42 is to filter out the frequency of the excitation coil which is inevitably picked up by the sense windings and which is one half the frquency of the carrier wave of the output signal. This filtered signal is then supplied to an amplitude demodulator to obtain a curve such as envelope 34' of FIGURE 4*f* and curve B of FIGURE 6. This demodulated signal is then supplied to Schmitt trigger 44.

By employing spatial differentiation of the induced flux pulse as a magnetic pole passes over the magnetic head, the present invention provides more accurate detection of a magneic pole than is achieved with standard heads employing amplitude or peak detection schemes. This feature allows the sensing of a record medium having data more densely stored than can be sensed by conventional heads. Furthermore, employment of the present invention is not dependent on the type of motion imparted to the record medium.

While the present invention has been particularly shown and described with reference to the preferred embodiment, it will be understood by those skilled in the art that changes and modifications in form and details may be made which modifications will, nevertheless, not depart from the spirit and scope of the present invention.

What is claimed is:

1. A magnetic head device for sensing data stored in a magnetic record medium in the form of magnetic poles the presence or absence of which represents the particular data stored and which poles are defined to be portions of the medium where the magnetic flux is perpendicular to medium surface and diverge therefrom longitudinally along said surface, said device comprising:

a pair of core pieces;

two probes each of which is formed of three segments, the respective first segments being positioned between and in the plane of said core pieces to define three distinct gaps spaced apart in the direction of movement of the record medium, the respective second segments being spaced apart by a distance greater than any of said gaps and the respective third segments being in contiguous contact with one another and in contact with said core pieces;

a sense winding wound about one of said second segments in one direction and about the other of said second segments in the opposite direction; and means coupled to said third segments to periodically block any flux traversal therethrough such that the signal induced in said sense winding is in the form of an amplitude modulated waveform, the envelope of which represents the spatial derivative of the flux associated with the data stored in the record media.

2. A magnetic head device according to claim 1 wherein said periodic blocking means includes an excitation coil positioned between said third segments; and means connected to the said excitation coil to provide thereto a preselected frequency of electrical oscillations.

3. A magnetic head device according to claim 1 which includes demodulation means coupled to said sense windings to provide an output signal in the form of the envelope of said amplitude modulated waveform.

4. A magnetic head device for sensing data stored in a magnetic record medium in the form of magnetic poles the presence or absence of which represents the particular data stored and which poles are defined to be portions of the medium where the magnetic flux is perpendicular to medium surface and diverge therefrom longitudinally along said surface, said device comprising:

magnetic means, including two spaced apart magnetic circuit flux paths adapted to complete a magnetic circuit in response to only flux components perpendicular to the surface of the record medium, one of which magnetic circuit flux paths is displaced from the other in the direction of movement of said medium by a distance smaller than the dimension of a data bit portion;

excitation means coupled to said magnetic means to periodically saturate said magnetic means and block said magnetic circuit paths; and sensing means coupled to said magnetic means and responsive to said periodically blocked flux paths to receive the difference of two electrical signals corresponding respectively to said two flux paths, said difference signals being in the form of an amplitude modulated wave, the envelope of which is a function of the distance between said respective flux paths.

5. A magnetic head device according to claim 4 including demodulation means coupled to said sensing means to provide an output signal in the form of the envelope of said amplitude modulated waveform.

6. A magnetic head device according to claim 4 wherein the amplitude modulated wave is characterized by a phase shift when a magnetic pole resides between said two flux paths on the record medium, said device including phase detection means coupled to said sensing means to provide an output signal when there is a change of phase in said amplitude modulated waveform.

7. A magnetic head device according to claim 4 wherein said magnetic means includes:

a pair of core pieces; and two probes each of which is divided into three segments, the respective first segments being positioned between and in the plane of said core pieces to define three distinct gaps spaced apart in the direction of movement of the record medium, the respective second segments being spaced apart by a distance greater than any of said gaps, and the respective third segments being in contiguous contact with one another and in contact with said core pieces.

8. A magnetic head device according to claim 7 wherein said sensing means includes a sense winding wound about one of said second segments in one direction and about the other of said second segments in the opposite direction.

9. A magnetic head device according to claim 7 wherein said excitation means includes:

an excitation coil positioned between said third segments; and means connected to said excitation coil to provide a preselected frequency of electrical oscillation thereto.

10. A magnetic head device for sensing data stored in a magnetic record medium in the form of magnetic poles the presence or absence of which represents the particular data stored and which poles are defined to be portions of the medium where the magnetic flux is perpendicular to medium surface and diverge therefrom longitudinally along said surface, said device comprising:

magnetic means including two magnetic probes each of which is adapted to respond to and, complete a magnetic circiut for, only a magnetic flux component perpendicular to a magnetic record medium, said probes being positioned relative to said record medium so as to be displaced from one another in the direction of movement of said medium;

a sense winding wound about one of said probes in one direction and about the other of said probes in the opposite direction; and means coupled to said probes to periodically block flux traversal therethrough to induce a signal in said sense windings in the form of an amplitude modulated waveform the envelope of which represents the spatial derivative of the flux associated with data stored in the record media.

References Cited

UNITED STATES PATENTS

| | | | |
|---|---|---|---|
| 3,239,823 | 3/1966 | Chang | 340—174.1 |
| 3,150,358 | 9/1964 | Newman et al. | 340—174.1 |

BERNARD KONICK, *Primary Examiner.*

A. I. NEUSTADT, *Assistant Examiner.*